(12) United States Patent
Kock et al.

(10) Patent No.: US 6,868,946 B2
(45) Date of Patent: Mar. 22, 2005

(54) METHOD FOR CONTROLLING THE DAMPER CURRENT FOR AN ELECTRICALLY ADJUSTABLE DAMPER

(75) Inventors: Jörg Kock, Burgwedel (DE); Ralf Johannknecht, Gehrden (DE); Jörg Grotendorst, Garbsen (DE); Stefan Zoufal, Dedensen (DE); Alexander Stiller, Garbsen (DE); Hermann Hoinkhaus, Burgwedel (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 10/140,816

(22) Filed: May 9, 2002

(65) Prior Publication Data

US 2002/0166741 A1 Nov. 14, 2002

(30) Foreign Application Priority Data

May 9, 2001 (DE) .......................................... 101 22 536
May 22, 2001 (DE) .......................................... 101 25 228

(51) Int. Cl.$^7$ ................................................ F16F 9/52
(52) U.S. Cl. ................. 188/266.1; 188/267; 188/267.1; 188/267.2
(58) Field of Search .......................... 188/322.19, 266.2, 188/266.3, 266.4, 266.5, 266.1, 267.1, 267

(56) References Cited

U.S. PATENT DOCUMENTS

| | | | | |
|---|---|---|---|---|
| 4,526,401 A | * | 7/1985 | Kakizaki et al. .......... | 188/266.8 |
| 4,969,662 A | * | 11/1990 | Stuart ....................... | 280/5.515 |
| 4,989,148 A | * | 1/1991 | Gurke et al. ............. | 280/5.515 |
| 5,090,525 A | * | 2/1992 | Ohlin ....................... | 188/266.5 |
| 5,251,728 A | * | 10/1993 | Mund et al. ............. | 188/266.6 |
| 5,296,785 A | * | 3/1994 | Miller ....................... | 318/254 |
| 5,488,562 A | | 1/1996 | Otterbein et al. | |
| 5,721,681 A | * | 2/1998 | Borschert et al. ............. | 701/37 |
| 5,924,703 A | * | 7/1999 | Ichimaru .................. | 280/5.515 |
| 5,960,915 A | * | 10/1999 | Nezu et al. ............... | 188/266.6 |
| 6,067,490 A | * | 5/2000 | Ichimaru et al. .......... | 188/266.2 |
| 6,315,094 B1 | | 11/2001 | Griffin et al. | |

OTHER PUBLICATIONS

US 6,243,631, 6/2001, Ohsaku (withdrawn)

* cited by examiner

Primary Examiner—Robert A. Siconolfi
(74) Attorney, Agent, or Firm—Walter Ottesen

(57) ABSTRACT

A method controls the damper current of a damper of a motor vehicle. The damper is adjustable by an electrical current and the permissible change of the current per time interval is delimited by a limit.

7 Claims, 5 Drawing Sheets

METHOD FOR CONTROLLING THE DAMPER CURRENT FOR AN ELECTRICALLY ADJUSTABLE DAMPER

FIELD OF THE INVENTION

The invention relates to a method for controlling the damper current of an electrically adjustable damper of a motor vehicle. With dampers of this kind, the vibrations of the vehicle bodywork relative to the wheels of the motor vehicle are damped.

BACKGROUND OF THE INVENTION

Electrically adjustable dampers are known from the state of the art. In these electrically adjustable dampers, the damper desired force can be adjusted with the aid of a controllable electrical current in dependence upon the driving situation of the motor vehicle in which the damper is mounted. Here, the current is controlled with the aid of a current/damping-force characteristic line, wherein a specific damping force is pregiven in dependence upon the vehicle situation and, from this characteristic line, it is determined which current is to be adjusted in order to adjust the pregiven damping force. This method of controlling electrically adjustable dampers is also utilized in the skyhook control method, which is disclosed, for example, in the following U.S. Pat. Nos.: 5,488,562; 6,243,631; and, 6,315,094.

In the control of the current for the electrically adjustable dampers of a motor vehicle, current jumps lead to jumps in the damping force of the particular damper so that the damping force can be adapted very rapidly to the driving situation of the motor vehicle. However, it has been shown that jumps in the damping force can cause unwanted noises in the motor vehicle.

SUMMARY OF THE INVENTION

It is the object of the invention to reduce the above noises and/or to suppress them as completely as possible.

The method of the invention is for controlling an electrical damper current of a damper of a motor vehicle. The damper is adjustable via the electrical damper current and the method includes the step of delimiting a permissible change of the electrical damper current per time interval via a limit.

According to a feature of the invention, the permissible change of the current (which current is utilized for controlling the electrically adjustable damper and therefore the permissible change of the damping force) is limited per unit of time. By setting a limit for the current change, and starting from the instantaneously adjusted damping force, damping forces can only be adjusted within specific limits. These limits are so matched that no disturbing noises result in the vehicle because of the damping force change which results in a time interval because of the current change.

The advantage of the invention is that disturbing noises in the motor vehicle, which are caused by an intense jump-like change of the damper current of an electrically adjustable damper, can be reduced and/or suppressed. A further advantage of the invention is that, for this reduction or suppression, no additional components such as mufflers, et cetera or changes of existing components are necessary. A further advantage of the invention is that the control of the electrically adjustable damping force is possible in an unlimited manner via the current within specific pregiven limits.

According to another feature of the invention, for a positive current change (that is, for an adjustment of the current to higher current values, which effect a greater damping force), a different limit for the adjustment per time interval is pregiven than for a negative current change (that is, the adjustment of the current to lower current values and therefore the adjustment of the damping force to lower force values). The advantage of this embodiment becomes manifest when one considers that the current/damping-force characteristic line does not run linearly. Rather, for some typical electrical dampers, the current/damping-force characteristic line runs progressively. If, in this case, a lower limit is pregiven for the positive current change per time interval than for the negative current change per time interval, the progressive trace of the current/damping-force characteristic line can be compensated; that is, the jumps in the damper force can be selected to have approximately the same magnitude independently of the direction in which the current is to be changed.

According to another feature of the invention, the limit per time interval for the positive current change as well as the limit for the current change per time interval for the negative current change is pregiven in dependence upon the desired current to which the control is to be made. The advantage of this embodiment is that an additional possibility is provided to preset the limits for the current change in dependence upon the current/damping-force characteristic line and to adapt the limits to this characteristic line.

According to a further embodiment of the invention, the limit of the permissible current change per time interval for the positive current change as well as for the negative current change is preset as a function of the speed of the bodywork of the motor vehicle (that is, the relative speed of the bodywork of the motor vehicle to the wheel of the motor vehicle in the region of the particular damper). This embodiment is especially advantageous when applying the skyhook control method because, in this control method, the damping force requirement is derived from the bodywork speed and, in the simplest case, utilizing a proportional member. In this case, a low damping force request is adjusted for low bodywork speeds and a high damping force request is adjusted for high bodywork speeds. Especially for low damping force speeds, large current jumps are avoided because of the method of the invention in that for low bodywork speeds, the permissible current change is greatly limited.

According to another embodiment of the invention, the duration of the time intervals within which a specific current change is permitted (which is restricted by the limits) lies in the range of 1 ms to 50 ms, preferably, in the range of 15 to 25 ms.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
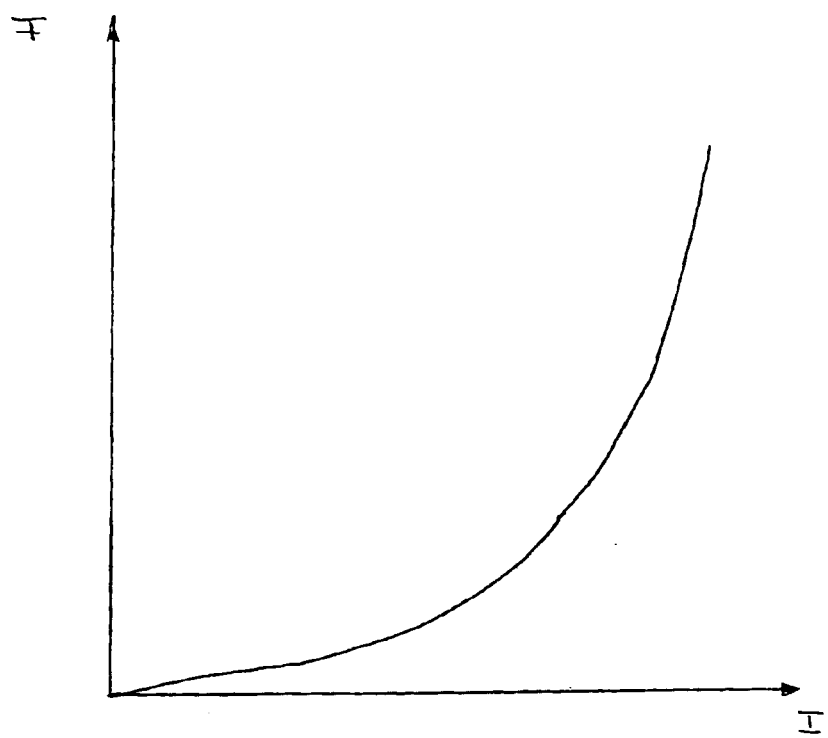
FIG. 1 shows an exemplary plot of a current/damping-force characteristic line for an electrically adjustable damper of a motor vehicle for a specific bodywork speed.

FIG. 1 shows, by way of example, a current/damping-force characteristic line for an electrically adjustable damper of a motor vehicle for a specific bodywork speed (a separate current/damping-force characteristic line corresponds to each bodywork speed of the motor vehicle and such a characteristic line is correspondingly stored in the control unit of the motor vehicle).

The damper of the motor vehicle is controlled as described below.

The damping force F has a specific value which is adjusted via a specific electrical current at the damper. The electronics of the motor vehicle detect that the instantaneous damping force must be adapted (for example, increased) because of the driving situation of the motor vehicle. From the characteristic line, the new current to be adjusted is determined and is correspondingly adjusted at the damper so that the desired damping force is present after the adjustment at the damper. Here, it has been shown that, because of specific current jumps, jumps in the damping force are generated which lead to unwanted noises in the motor vehicle. According to the invention, these noises are reduced or suppressed in that, starting from the instantaneous current, the permissible change of the current per time interval is delimited by a limit. For a positive current change, another limit can be preset than for a negative current change so that an adaptation to the current/damping-force characteristic line is possible by presetting the limits (for the characteristic line shown, one would preset a lower limit for the positive current change because of the progressive trace than for a negative current change).

Figure 2:
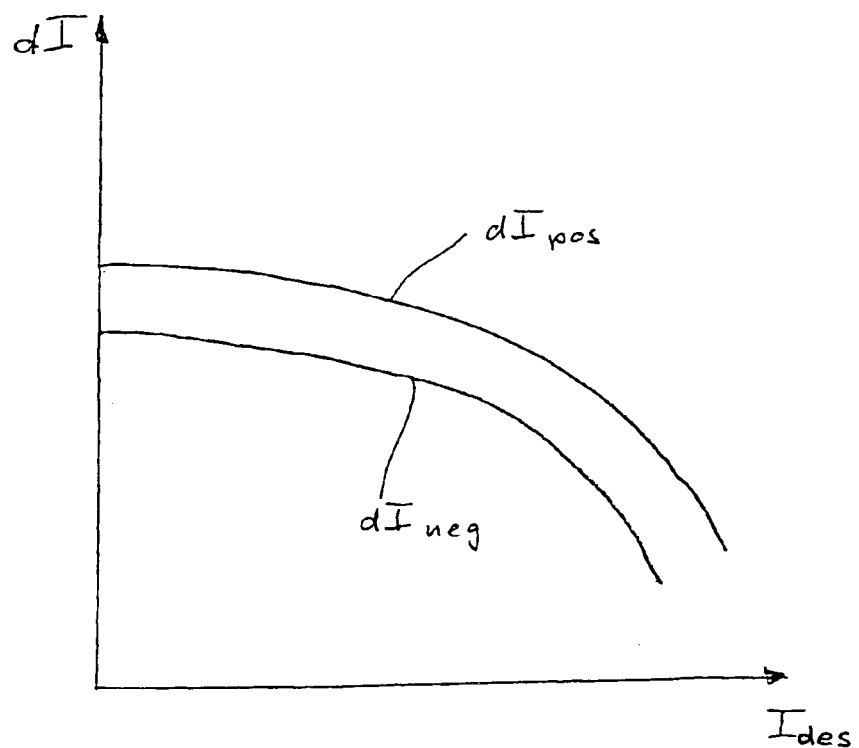
FIG. 2 shows exemplary characteristic lines as to how the limits can be preset in dependence upon the desired current to be adjusted.

Furthermore, it is possible to preset the limit for the permissible change of the current per time interval in dependence upon the desired current to be adjusted. Exemplary characteristic lines as to how the limits can be pregiven in dependence upon the desired current to be adjusted are shown in FIG. 2. Here, the upper characteristic line provides the respective limits for the positive current changes and the lower characteristic line provides the respective limits for the negative current changes. The characteristic lines are, in turn, adapted to the trace of the characteristic line shown in FIG. 1, that is, as the desired current $I_{des}$ becomes greater, the permissible limits become lower because the characteristic line of FIG. 1 runs progressively.

Figure 3A:
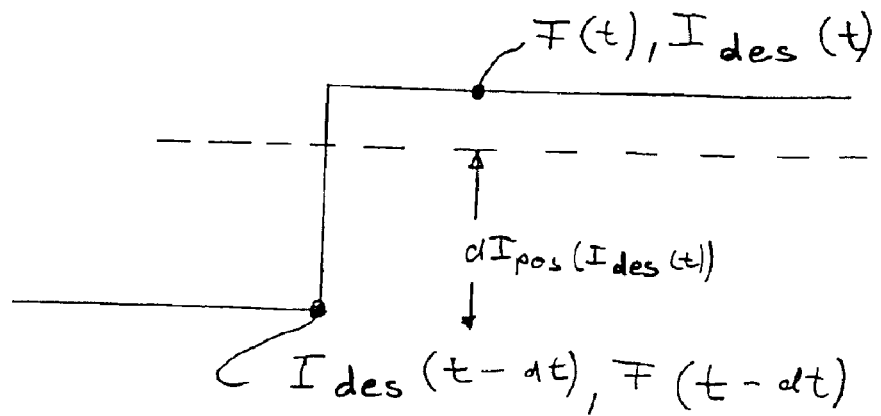
FIG. 3a shows by way of example how the control of the method of the invention takes place.

FIG. 3a shows by way of example how the control according to the invention takes place when, starting from a specific time point (t–dt), the instantaneously adjusted damping force must be increased because of the driving situation of the motor vehicle. At time point (t–dt), the damping force is given by F(t–dt) and the current by $I_{des}$(t–dt). Furthermore, in the control electronics of the motor vehicle, a determination is made on the basis of the specific driving situation that the damping force at time point t would have to be given by F(t) to which a specific desired current $I_{des}$(t) corresponds. The desired current $I_{des}$(t) is determined from the corresponding current/damping-force characteristic line according to FIG. 1. Also, at the time point t, the limit is determined in the control electronics for the positive current change $dI_{pos}$(t) in the time interval dt (for example, from a characteristic line according to FIG. 2).

When a check in the control electronics of the motor vehicle shows that $I_{des}$(t) is greater than $I_{des}$(t–dt)+$dI_{pos}$(t), then the current $I_{des}$(t–dt)+$dI_{pos}$(t) is adjusted by the control electronics at the corresponding damper. Stated otherwise, in this case, the positive current change dI is limited by the limit $dI_{pos}$. Accordingly, a damping force is adjusted which is less than the theoretically computed damping force F(t). At this damping force, however, it is ensured that no disturbing noises occur with a changeover. When it is, in a reverse situation, shown that $I_{des}$(t) is of the same magnitude or less than $I_{des}$(t–dt)+$dI_{pos}$(t), then the specific value is precisely adjusted by the control electronics of the motor vehicle.

Figure 3B:
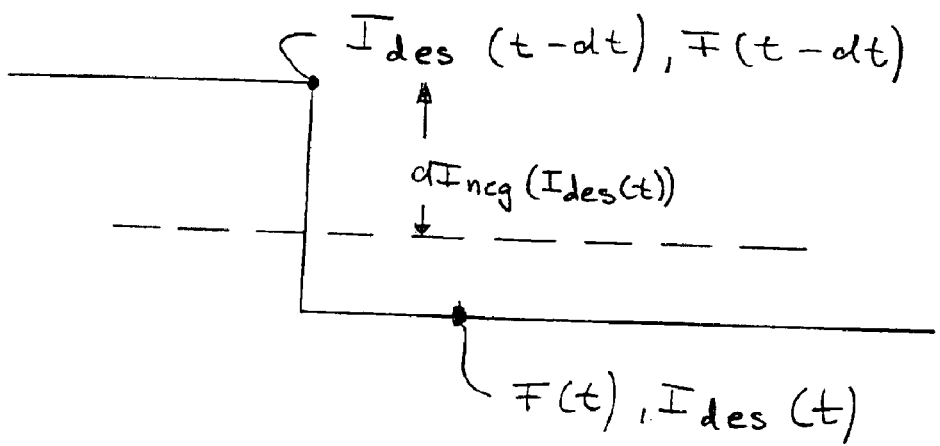
FIG. 3b shows the corresponding relationships for the case wherein F(t−dt) is greater than the damping force which should have been adjusted at time point t and is pregiven by F(t)

FIG. 3b shows the corresponding conditions for the case that F(t–dt) is greater than the damping force which should be adjusted at time point t and is given by F(t). In this case, the control is undertaken by the control electronics in the same way with the single difference that, for the limit of the current change per time interval dt, the value $d_{neg}$(t) is preset which is determined from the characteristic line of FIG. 2.

Corresponding controls are undertaken by the control electronics of the motor vehicle in directly sequential time intervals dt whose length lies in the range of 1 ms to 50 ms, preferably in the range of 15 to 25 ms.

Figure 4:
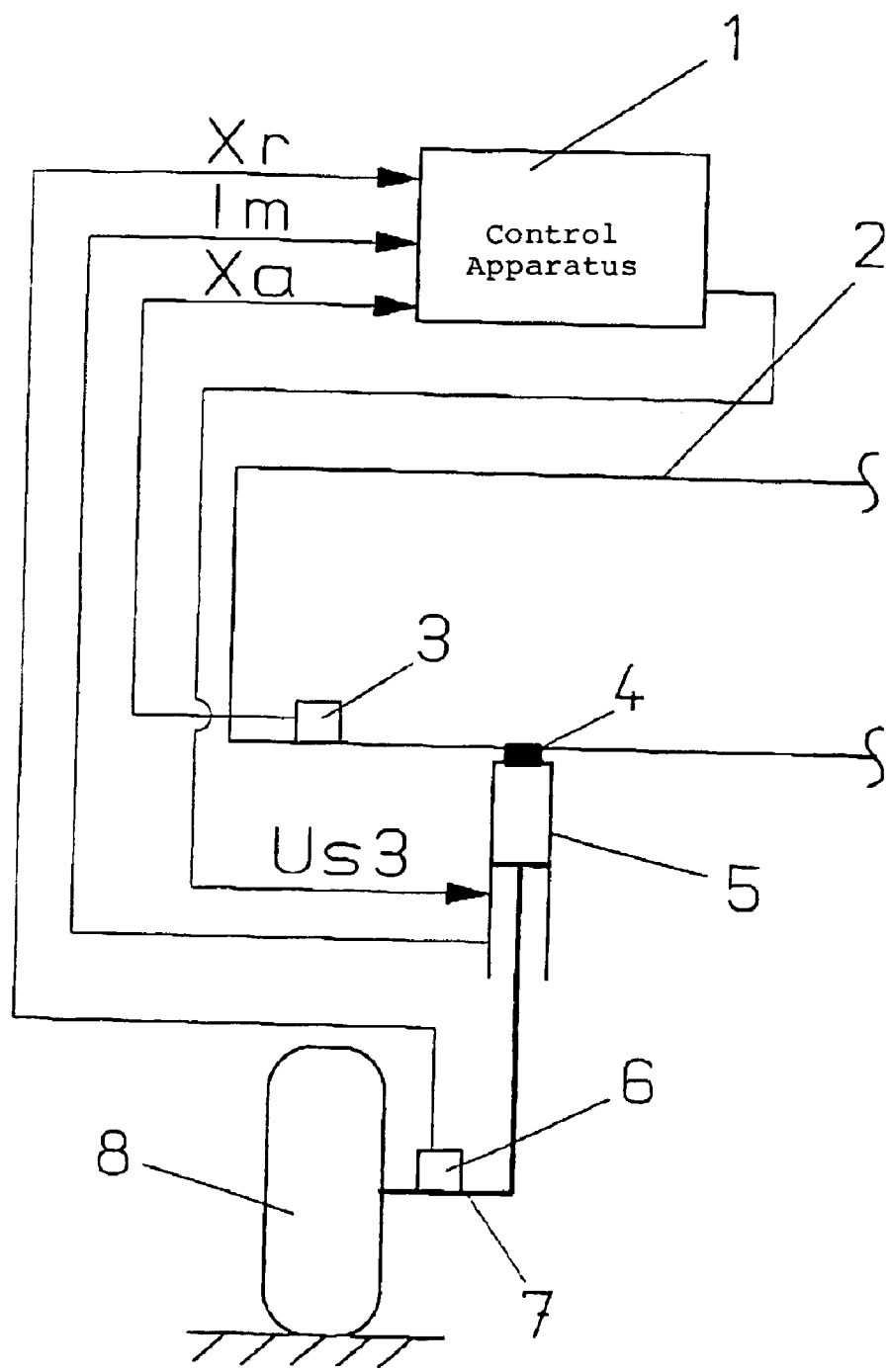
FIG. 4 is a schematic showing a damper control loop.

FIG. 4 shows, by way of example, the schematic half axle of a vehicle (not shown). The bodywork 2 of the vehicle is connected to a semi-active controllable shock absorber 5 via a damper bearing 4. A wheel suspension 7 is attached to the shock absorber 5 and a wheel 8 is attached to the wheel suspension 7. The vibrations of the bodywork 2 and of the wheel suspension 7 are detected by acceleration sensors (3, 6). The measuring signals (Xr, Xa) of the acceleration sensors (3, 6) are transmitted into a control apparatus 1 for further processing. The control apparatus 1 adjusts a desired voltage Us3 at the shock absorber in dependence upon the measuring signals (Xr, Xa) of the acceleration sensors (3, 6) and the measured damper current Im. The desired voltage Us3 determines the damping characteristic of the shock absorber 5.

Figure 5:
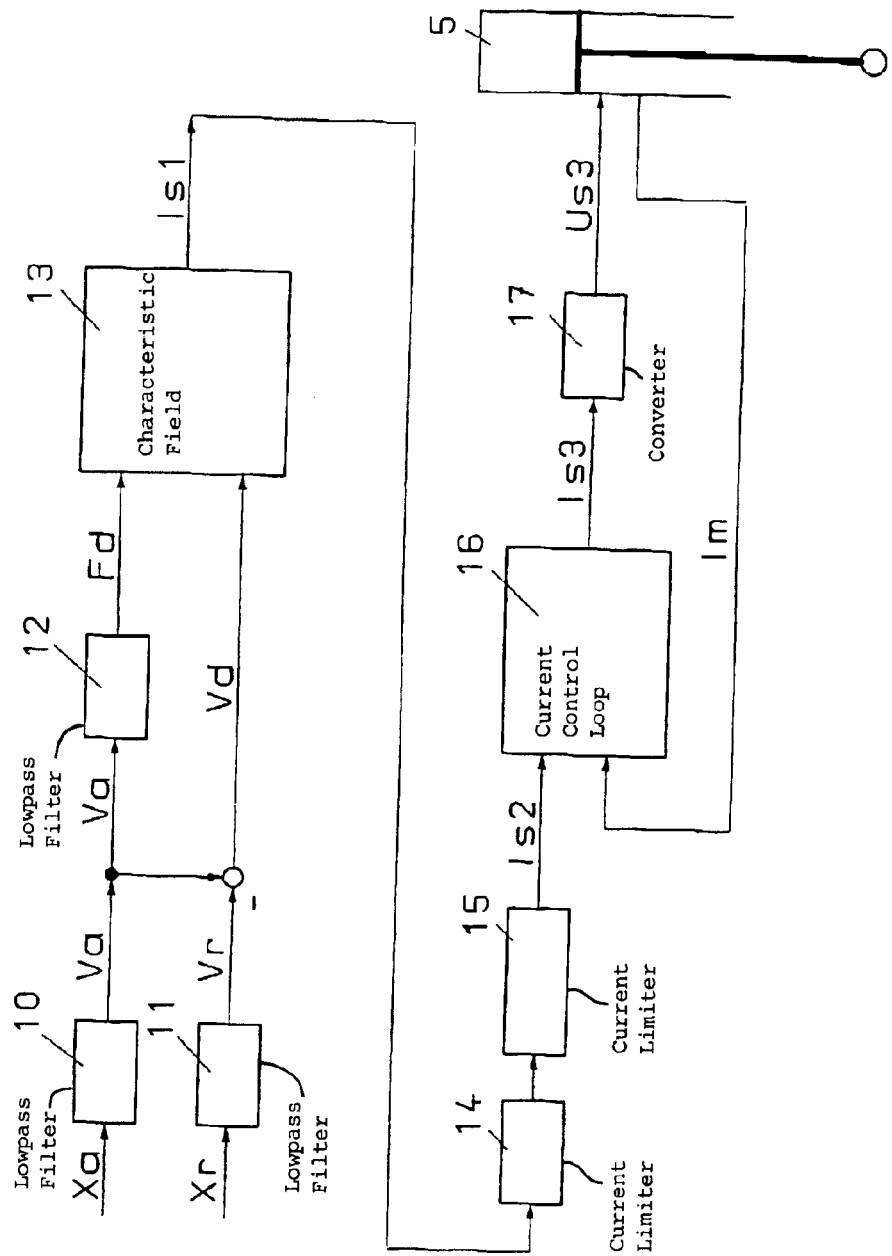
FIG. 5 is a block diagram showing the function sequence of the damper control loop; and, FIG. 6 shows a three-dimensional damper characteristic field.

FIG. 5 schematically shows the sequence of the control in the control apparatus 1. The measuring signals (Xr, Xa) of the acceleration sensors (3, 6) are converted into velocity signals (Vr, Va) by lowpass filters (10, 11). The velocity signal Va is again filtered by a lowpass filter 12 and the damping force Fd is computed as the output signal. The difference of the velocity signals Va and Vr yields the velocity signal Vd of the shock absorber 5. The current desired value Is1 is computed in a three-dimensional damping characteristic field 13 (FIG. 6) from the damping force Fd and the velocity Vd of the shock absorber 5. The current desired value Is1 is supplied to the current limiter (14, 15) and the current desired value Is2 is computed as a result. (For block 14, reference can be made to FIG. 2 and for block 15 to FIGS. 3a and 3b.) With this current desired value Is2 and with the measured current value Im of the shock absorber 5, the current desired value Is3 is computed in a current control loop 16. The current desired value Is3 is converted into a voltage value Us3 in an actuating member and this voltage value is supplied to the shock absorber 5 as a control quantity.

Figure 6:
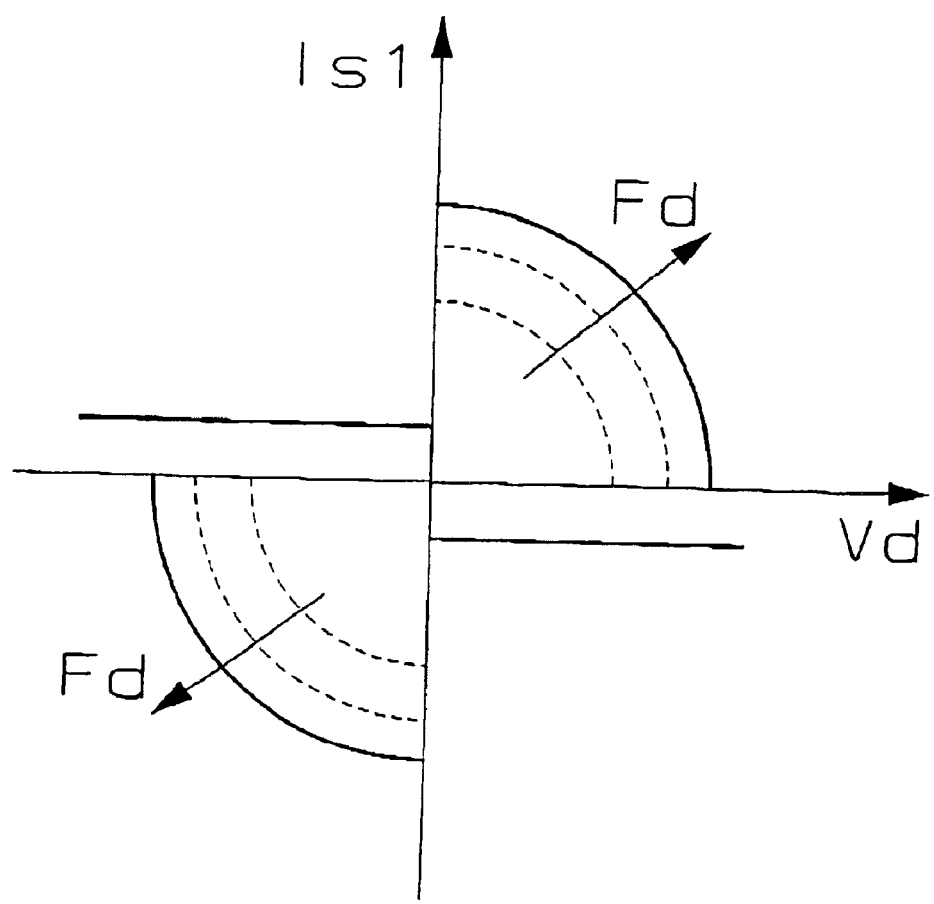

FIG. 6 shows a three-dimensional damper characteristic field of block 13 of FIG. 5 with which the current desired value Is1 is computed (skyhook method) based on the measured velocity Vd of the shock absorber 5 and the computed damper force Fd of the shock absorber. If the velocity Vd of the shock absorber 5 has an opposite sign relative to the damper force Fd, the desired shock absorber force Fd cannot be converted because a semi-active shock absorber 5 is used. For this reason, the constant current desired value Is1 is pregiven for the least damaging shock absorber force Fd, for example, the minimum current desired value Is1 is pregiven if there the shock absorber force Fd is minimal.

It is understood that the foregoing description is that of the preferred embodiments of the invention and that various changes and modifications may be made thereto without departing from the spirit and scope of the invention as defined in the appended claims.

What is claimed is:

1. A method for controlling an electrical damper current of a damper of a motor vehicle, the damper being adjustable via the electrical damper current to control the damping force of said damper, the method comprising the steps of:

providing a current/damning force characteristic line for a present electrical damper current;

determining a desired electrical damning current ($I_{des}$) from said current/damning force characteristic line;

setting a limit for limiting a permissible change of said electrical damper current per interval of time; and after said desired electrical damning current ($I_{des}$) has been determined, limiting said permissible change of said electrical damper current per interval of time to said limit whereby changes of said damping force are adjusted to suppress or reduce disturbing noises which result in said vehicle because of said damper.

2. The method of claim 1, wherein, proceeding from a specific current value, the method comprises the further step of presetting a different limit for a positive current change than for a negative current change.

3. The method of claim 2, wherein the method comprises the further step of presetting the limit for the positive current change and the limit for the negative current change in dependence upon the desired current to which said damper current is to be controlled.

4. The method of claim 3, wherein the limits of the permissible current change per time interval for the positive current change and for the negative current change are preset as a function of the velocity of the bodywork of the motor vehicle.

5. The method of claim 4, wherein the duration of said time interval wherein a specific current change is permitted lies in the range of 1 to 50 ms; and, said current change is delimited by a limit.

6. The method of claim 5, wherein said range is 15 to 25 ms.

7. A method for controlling an electrical damper current of a damper of a motor vehicle, the damper being adjustable via the electrical damper current, the method comprising the steps of:

providing a current/damping force characteristic line for a present electrical damper current;

determining a desired electrical damning current ($I_{des}$) from said current/damning force characteristic line;

proceeding from a specific current value, presetting a different limit for a positive change of said current than for a negative change of said current;

delimiting a permissible change of said current of said damper per time interval to either of said limits; and after said desired electrical damping current ($I_{des}$) has been determined, limiting said permissible change of said electrical damper current per time interval to said delimited limit.

* * * * *

UNITED STATES PATENT AND TRADEMARK OFFICE
CERTIFICATE OF CORRECTION

PATENT NO. : 6,868,946 B2
DATED : March 22, 2005
INVENTOR(S) : Joerg Kock et al.

It is certified that error appears in the above-identified patent and that said Letters Patent is hereby corrected as shown below:

Column 5,
Lines 18, 20, 21 and 25, delete "damning" and substitute -- damping -- therefor.

Column 6,
Lines 23 and 24, delete "damning" and substitute -- damping -- therefor.

Signed and Sealed this

Twenty-fourth Day of May, 2005

JON W. DUDAS
*Director of the United States Patent and Trademark Office*